United States Patent [19]

Ino et al.

[11] Patent Number: 5,268,346
[45] Date of Patent: Dec. 7, 1993

[54] CATALYSTS FOR THE HIGH-TEMPERATURE STEAM REFORMING OF HYDROCARBONS

[75] Inventors: Takashi Ino; Iwao Anzai; Yuzo Fujino, all of Yokohama, all of Japan

[73] Assignees: Nippon Oil Co., Ltd.; Petroleum Energy Center Foundation, Tokyo, Japan

[21] Appl. No.: 844,127

[22] Filed: Mar. 2, 1992

[30] Foreign Application Priority Data

Mar. 12, 1991 [JP] Japan .................................. 3-070423

[51] Int. Cl.$^5$ .......................... B01J 23/10; B01J 23/46
[52] U.S. Cl. ..................................... 502/304; 423/652
[58] Field of Search .......................... 502/304; 423/652

[56] References Cited

U.S. PATENT DOCUMENTS

| | | | |
|---|---|---|---|
| 3,222,132 | 12/1965 | Dowden et al. | 423/652 |
| 4,367,166 | 1/1983 | Fujitani et al. | 252/462 |
| 4,714,694 | 12/1987 | Wan et al. | 502/304 |
| 4,943,549 | 7/1990 | Immel et al. | 502/304 |

FOREIGN PATENT DOCUMENTS

| | | |
|---|---|---|
| 0333037 | 9/1989 | European Pat. Off. |
| 2119277 | 11/1983 | United Kingdom . |
| 8600885 | 2/1986 | World Int. Prop. O. . |

OTHER PUBLICATIONS

Patent Abstracts of Japan, No. 5148 Sep. 18, 1981 & JP-56 081 392 (JGC Corp) Jul. 3, 1981 abstract.

*Primary Examiner*—W. J. Shine
*Attorney, Agent, or Firm*—Bucknam and Archer

[57] ABSTRACT

A catalyst for the steam reforming of hydrocarbons characterized in that 0.1-2 wt. % of ruthenium is carried on a carrier which comprises 5-40 wt. % of ceria or rare element oxides containing ceria as the main ingredient and 60-95 wt. % of alumina, and that an atomic ratio of cerium to ruthenium (Ce/Ru) in the catalyst is in the range of from more than 10 to 200.

4 Claims, No Drawings

CATALYSTS FOR THE HIGH-TEMPERATURE STEAM REFORMING OF HYDROCARBONS

BACKGROUND OF THE INVENTION

1. Field of the Invention

This invention relates to a catalyst for the high-temperature steam reforming of hydrocarbons and more particularly to such a catalyst which exhibits high activity and a long catalytic life and precipitates less carbon even when used particularly under a comparatively low pressure and a low steam/carbon ratio.

2. Prior Art

The high-temperature steam reforming of hydrocarbons is carried out as a process for producing hydrogen by reacting hydrocarbons with steam at high temperatures and, in the operation of the process, a temperature at the inlet of the catalyst bed and a temperature at the outlet thereof are 500°–600° C. and 700°–850° C., respectively. In this process, there are obtained carbon monoxide, carbon dioxide and a minute amount of methane. Catalysts which have heretofore been used in such a process for the high-temperature reforming of hydrocarbons, are Ni-based ones containing an alkali metal or alkaline earth metal. An ordinary high-temperature steam reforming reaction is carried out under a comparatively high pressure (20 Kgf/cm$^2$ or higher) and a high steam/carbon ratio (3.0 or higher), but as low a reaction pressure as possible is preferred for a fuel cell system in which gases obtained by the steam reforming of naphtha or kerosene are used as a fuel, from the standpoint of apparatus within said system being easily handled. Further, it is preferable to carry out steam reforming at as low a steam/carbon ratio as possible from the viewpoint of electricity generation efficiency. If, with respect to the fuel cell, an ordinary Ni-based catalyst is used in steam reforming which requires a low pressure and a low steam/carbon ratio, there will be raised a serious problem as to the precipitation of carbon on the reforming catalyst. In a case where carbon precipitation on the catalyst is remarkable, the catalyst bed will be blocked with the result that the pressure drop at the catalyst bed (difference between the pressures) is increased and further continuous operation of the apparatus comes to be impossible as far as the catalyst is not exchanged by new one. In addition, frequent exchange of the catalyst will remarkably aggravate the economy of the fuel cell system. It is therefore desirable to use, as a steam reforming catalyst, a catalyst which will precipitate carbon in as small an amount as possible when used.

As such catalysts as precipitate less carbon, rhodium- or ruthenium-based catalysts have been known to be particularly effective. For example, Japanese Pat. Appln. Laid-Open Gazettes Nos. Hei 2-43950 (43950/90), Hei 2-2878 and Hei 2-2879 as well as Sho 56-91844 (91844/81) propose noble metal-based catalysts carried on zirconia. Even these proposed catalysts will not be able to sufficiently inhibit carbon precipitation if they are used under a low pressure and a low steam/carbon ratio.

Further, Japanese Patent Gazette No. Sho 59-29633 (29633/84) describes that a ruthenium catalyst in which ceria is used as an adjuvant catalyst is effective for a low-temperature steam reforming reaction of hydrocarbons, but this catalyst is still not sufficiently effective for a high-temperature steam reforming.

SUMMARY OF THE INVENTION

This invention relates to a catalyst which is suitable as such for a high-temperature steam reforming reaction, precipitates less carbon even when used under a low pressure and a low steam/carbon ratio and has high activity and a long catalytic life. The primary object of this invention is to provide such a catalyst as above.

The present inventors made intensive studies to aim mainly at inhibition of carbon precipitation and, as the result of their studies, they found that carbon precipitation can be inhibited by the use of a specified catalyst. This invention is based on this finding.

The object of this invention is achieved by the provision of a catalyst which comprises 0.1–2 wt. % of ruthenium carried on a carrier comprising 0.5–5 wt. % of at least one kind of a metal in the oxide form selected from the group consisting of alkali metals and alkaline earth metals, 5–40 wt. % of a member selected from the group consisting of ceria and rare earth element oxides containing ceria as the main ingredient and in which the cerium/ruthenium (Ce/Ru) atomic ratio is in the range of from more than 10 to 200.

The materials used as a carrier in this invention include ceria, rare earth element oxides containing ceria as the main component, alumina, alkali metals and alkaline earth metals.

The method for preparing ceria for use in this invention is not particularly limited, and such ceria may be prepared by an ordinary method from, for example, cerium nitrate [Ce(NO$_3$)$_3$.6H$_2$O], cerium chloride [CeCl$_3$.7H$_2$O], cerium hydroxide [Ce(OH)$_4$] or cerium carbonate [Ce$_2$(CO$_3$)$_3$.8H$_2$O]. This ceria may also be prepared from a salt of a mixed rare earth element containing cerium as the main ingredient.

The rare earth element oxides containing ceria as the main ingredient contain ceria in an amount of at least 50 wt. %, preferably 50–95 wt. % and more preferably 70–90 wt. %. The rare earth element oxides other than ceria include the oxides of scandium (sc), yttrium(Y), lanthanum(La), praseodymium(Pr), neodymium(Nd), promethium(Pm), samarium(Sm), europium(Eu), gadolinium(Gd), terbium(Tb), dysprosium(Dy), holmium(Ho), erbium(Er), thullium(Tm), ytterbium(Yb) and lutetium(Lu) with the oxides of yttrium, lanthanum and neodymium being preferred and the oxides of lanthanum being more preferred.

The alkali metals used herein include Li, Na, K, Rb, Cs and Fr. The alkaline earth metals used herein include Mg, Ca, Sr, Ba and Ra. These metals may be used singly or jointly. Among the alkali metals, Cs and K are preferred and Cs is more preferred. Among the alkaline earth metals, Mg, Ba and Ca are preferred and Ba is more preferred. These metals may be used in the form of an oxide, hydroxide, carbonate, nitrate or the like. The alumina used herein may be in the α, β, γ, η, θ, κ or χ crystal form with the γ crystal form being particularly preferred. Further, there may also be used alumina hydrates such as boehmite, bialite and gibbsite.

The catalyst carrier used in this invention comprises 5–40 wt. %, preferably 10–35 wt. %, of (component I) ceria and rare earth element oxides containing ceria as the main ingredient and 60–95 wt. %, preferably 65–90 wt. %, of (component II) alumina in the case where the carrier is a binary material comprising the component I and component II. If the amount of the component I is less than 5 wt. %, carbon precipitation inhibiting effects and activity accelerating effects obtained by ceria will undesirably be insufficient. If, on the other hand, the amount of the component I is more than 40 wt. %, the resulting carrier will decrease in surface area with the result that sufficient catalytic activity is not obtained. Further, the content of ceria in the carrier must be such that the atomic ratio (Ce/Ru) of ceria to ruthenium is in the range of from more than 10 to 200, preferably from more than 10 to 50. If the atomic ratio is 10 or less, the ceria will undesirably exhibit less activity as a promoter for ruthenium. If, on the other hand, the atomic ratio is more than 200, the resulting carrier will decrease in surface area thereby failing to obtain sufficient catalytic activity.

Further, the carrier used in this invention comprises 5-40 wt. %. preferably 10-35 wt. % of (component I) ceria and rare earth element oxides containing ceria as the main ingredient, 60-89.5 wt. %, preferably 61-89.5 wt. % of (component II) alumina, and 0.5-5 wt. % preferably 0.8-4 wt. % of (component III) oxides of alkali metals and oxides of alkaline earth metals in the case where the carrier is a ternary material comprising the components I, II and III. For the same reason as above, it is also undesirable in this case that the amount of the component I is outside 5-40 wt. % and the atomic ratio (Ce/Ru) of ceria to ruthenium is outside over 10-200. If the amount of the component III is less than 0.5 wt. %, the component III will not exhibit carbon precipitation inhibiting effects. Further, if the component III is more than 5 wt. % in amount, it will exhibit lower catalytic activity.

The method for preparing the above catalyst carrier is not particularly limited, but it is desirable that the rare earth element oxides be present in a well-dispersed state in the resulting carrier. Such a carrier may be prepared for example by impregnating alumina with an aqueous solution of a salt of rare earth elements containing cerium as the main ingredient, drying the thus impregnated alumina and then firing the impregnated alumina so dried. The salts which may be used in this case, include a nitrate, chloride, sulfate and acetate. Particularly preferred are nitrates or organic acid salts which will easily be pyrolyzed by calcining to produce oxides. Such a carrier as above may also be prepared by an ordinarily used method such as a coprecipitation method, gel kneading method or sol gel method. However, it is undesirable that the rare earth element oxides and alumina are physically mixed together since in this case the rare earth element oxides are poorly dispersed in the resulting carrier.

To have alkali metals and alkaline earth metals contained in a carrier to be prepared, these metals may be added at the time of preparing ceria or alumina or may be treated so as to impregnate molded ceria and/or alumina therewith.

The catalyst carrier so prepared is calcined at a temperature of 500°-1400° C., preferably 700°-1200° C. before an active metal is carried on the carrier.

In this invention, the carrier may be incorporated with a small amount of a binder such as silica or cement to enhance the resulting catalyst in mechanical strength.

In the preparation of a catalyst of this invention, ruthenium is used as an active metal, and other Platinum Group metals may be incorporated in an amount less than that of the ruthenium carried. The other Platinum Group metals which may preferably be incorporated are rhodium, palladium and platinum. The amount of ruthenium carried is 0.1-2 wt. %, preferably 0.5-1.5 wt. %, of the catalyst weight (the total weight of the carrier and the active metal carried thereon). If the amount of ruthenium carried is more than 2 wt. %, then the catalytic activity will not so increase, this being uneconomical. If, on the other hand, the amount of the active metal carried is less than 0.1 wt. %, then the catalytic activity will undesirably be low. Ruthenium may be carried on the catalyst carrier by an ordinary method such as an impregnation, deposition, coprecipitation, kneading, ion-exchange or pore-filling method. The impregnation method is particularly preferred. Starting materials for ruthenium to be carried vary depending on a method for carrying ruthenium on the carrier, and they are usually the chlorides or nitrates of ruthenium. After the material for the active metal has been carried on the carrier, the resulting catalyst blank is reduced with hydrogen at 500°-1000° C., preferably 500°-700° C. to obtain a catalyst.

It is preferred that the catalyst of this invention have a surface area of 5-200 m$^2$/g and a porosity (pore volume) of 0.05-1.0 cc/g.

The reaction conditions under which the steam reforming reaction is effected using the catalyst of this invention are a temperature of 450°-650° C., preferably 500°-600° C., at the catalyst bed inlet, a temperature of 650°-850° C., preferably 700°-800° C., at the catalyst bed outlet, a reaction pressure of not higher than 50 kgf/cm$^2$, preferably 0.1-10 kgf/cm$^2$ and more preferably 0.1-2 kgf/cm$^2$, and a steam/carbon ratio of not higher than 2.5, preferably not higher than 2. In cases where the catalyst of this invention is used under these reaction conditions, it will remarkably exhibit its superiority as a catalyst for steam reforming.

Hydrocarbons to be subjected to steam reforming according to this invention include natural gas, LPG, naphtha and kerosene. Hydrocarbons having a sulfur content of not more than 0.5 wt. ppm are preferred. In cases where hydrocarbons to be used have a sulfur content of more than 0.5 wt. ppm, it is preferable that they be beforehand desulfurized by hydrodesulfurization, a sulfur adsorbent or the like. When the catalyst of this invention is used for naphtha, kerosene and the like which are liable to cause carbon precipitation, it will remarkably exhibit its superiority as a steam reforming catalyst.

PREFERRED EMBODIMENTS

This invention will be better understood by the following non-limitative Examples.

Example 1

(1) Preparation of Catalyst

One thousand cubic centimeters (1000 cc) of a mixed aqueous solution of cerium nitrate and aluminum nitrate (the 1000 cc solution containing 7.59 g of Ce(NO$_3$)$_3$ and 66.9 g of Al(NO$_3$)$_3$) were mixed with a 2N ammonia water in such an amount that the resulting mixture had a PH value of 10 to coprecipitate hydrates of ceria and alumina. These hydrates were suction filtered off, washed with two liters of pure water, dried at 120° C. for 24 hours and then calcined at 800° C. in air for 3 hours thereby to obtain a catalyst carrier the chemical composition of which is indicated in the following Table 1.

The thus obtained catalyst carrier was impregnated with an aqueous solution of ruthenium chloride in such an amount that the solution so impregnated in the carrier contained 1 wt. % of solid matter calculated as ruthenium metal, after which the carrier so impregnated with the solution was evaporated to dryness, pressure molded (3 mm$\phi \times$3 mm) and then reduced with hydrogen at 700° C. for 3 hours thereby to obtain a catalyst A having a surface area of 130 m$^2$/g. The catalyst was pulverized to obtain powder having a mesh size of 30–80 for use in a test for catalytic activity.

(2) Steam Reforming Reaction

The steam reforming reaction was carried out using a fixed bed microreactor. The amount of the catalyst packed was 5 cc. Starting hydrocarbons to be treated were a light naphtha (C/H atomic ratio 0.422, specific gravity 0.642, sulfur content 0.2 ppm), and the reaction conditions were as follows:

Reaction temperature 600° C., Reaction pressure 1 kgf/cm$^2$, steam/carbon ratio 1.5, GHSV 9000.

The reaction gas was subjected to quantitative analysis by chromatographing. The following Table 1 indicates the conversion rates of the starting naphtha which were determined from the gas produced 10 hours after the start of the reaction. The conversion rates in Table 1 are intended to mean ratios in which the carbon atoms of naphtha used have been converted to C$_1$ compounds. The conversion rates herein are represented by the following formula $$\text{Conversion rate} = \frac{\text{Total number of moles of (CO + CO}_2\text{ + CH}_4\text{) produced}}{\text{Number of carbon atoms of starting naphtha}} \times 100$$

Remarks: The conversion rate is originally a ratio of (CO+H$_2$) produced by conversion of starting naphtha to the starting naphtha, but the CO and H$_2$ are actually converted respectively to CO$_2$ and CH$_4$ due to thermal equilibrium. Thus, the "conversion rate" used herein is defined to be a ratio between (CO+CO$_2$+CH$_4$) produced by conversion of carbon atoms of starting naphtha and the starting naphtha, as is indicated in the above formula.

In addition, the catalyst used was withdrawn from the reactor after the end of the reaction and then measured for the amount of carbon deposited thereon. The amounts of carbon deposited are also shown in Table 1.

Example 2

Sixteen grams (16 g) of $\gamma$-alumina having a surface area of 165 m$^2$/g were immersed in 20 cc of an aqueous solution of cerium nitrate (the 20 cc solution containing 7.59 g of Ce(NO$_3$)$_3$), treated to evaporate the water to dryness and then calcined at 800° C. in air for 3 hours thereby to obtain a catalyst carrier. The composition of the thus obtained catalyst carrier is as indicated in Table 1.

Following the procedure of Example 1, ruthenium was carried on said catalyst carrier thereby to obtain a catalyst B having a surface area of 122 m$^2$/g. The catalyst B was estimated for its catalytic activity and measured for the amount of carbon deposited thereon after the end of the reaction, in the same manner as in Example 1. The results are as indicated in Table 1.

Example 3

Sixteen grams (16 g) of $\gamma$-alumina having a surface area of 165 m$^2$/g were immersed in 20 cc of an aqueous solution of cerium nitrate (the 20 cc solution containing 7.59 g of Ce(NO$_3$)$_3$), treated to evaporate the water to dryness, calcined at 800° C. in air for 3 hours, impregnated with cesium nitrate and then calcined at 800° C. in air for 3 hours thereby to obtain a catalyst carrier. The catalyst carrier contained 1 wt. % of cesium. The composition of this catalyst carrier is as indicated in Table 1.

Ruthenium was carried on the above catalyst carrier in the same manner as in Example 1, thereby to obtain a catalyst C having a surface area of 120 m$^2$/g. The catalyst C was also estimated for its catalytic activity, and the amount of carbon precipitated was also measured after the end of the reaction. The results are as shown in Table 1.

Comparative Example 1

Twenty grams (20 g) of $\gamma$-alumina having a surface area of 165 m$^2$/g were calcined at 800° C. in air for 3 hours thereby to obtain a catalyst carrier.

Following the same procedure as in Example 1, ruthenium was carried on said catalyst carrier thereby to obtain a catalyst D having a surface area of 143 m$^2$/g. Following the same procedure as in Example 1, this catalyst was evaluated for its catalytic activity and the amount of carbon precipitated was measured after the end of the reaction. The results are as shown in Table 1.

Comparative Example 2

One thousand (1000) cc of an aqueous solution of cerium nitrate (the 1000 cc solution containing 38.0 g of Ce(NO$_3$)$_3$) were mixed with a 2N ammonia water in such an amount that the resulting mixture had a pH value of 10, thereby to precipitate ceria hydrate. The ceria hydrate was suction filtered off, washed with 2 liters of pure water, dried at 120° C. for 24 hours and then calcined at 800° C. in air for 3 hours thereby to obtain a catalyst carrier having a chemical composition as shown in Table 1.

Following the same procedure as in Example 1, ruthenium was carried on the above catalyst carrier thereby to obtain a catalyst E having a surface area of 9 m$^2$/g. In the same manner as in Example 1, the catalyst E was estimated for its catalytic activity and the amount of carbon precipitated was measured after the end of the reaction. The results are as shown in Table 1.

Comparative Example 3

Nineteen (19) g of $\gamma$-alumina having a surface area of 165 m$^2$/g were immersed in 20 cc of an aqueous solution of cerium nitrate (the 20 cc solution containing 1.90 g of Ce(NO$_3$)$_3$), treated to evaporate the water to dryness and then calcined at 800° C. in air for 3 hours thereby to obtain a catalyst carrier having a chemical composition as shown in Table 1.

Following the same procedure as in Example 1, ruthenium was carried on said catalyst carrier thereby to obtain a catalyst F having a surface area of 137 m$^2$/g. This catalyst was estimated for its catalytic activity and the amount of carbon precipitated was measured after the end of the reaction, in the same manner as in Example 1. The results are as indicated in Table 1.

TABLE 1

|  | A | B | C | D | E | F |
|---|---|---|---|---|---|---|
| Composition of carrier |  |  |  |  |  |  |
| Al$_2$O$_3$ | 80 | 80 | 79 | 100 |  | 95 |
| CeO$_2$ | 20 | 20 | 20 |  | 100 | 5 |
| Cs$_2$O |  |  | 1 |  |  |  |
| Ce/Ru atm/atm | 12 | 12 | 12 | 0 | 58 | 3 |
| Conversion rate (%) | 75 | 80 | 85 | 53 | 44 | 68 |
| Amount of carbon (wt %) | 0.12 | 0.13 | 0.10 | 1.85 | 0.06 | 0.75 |

Table 1 indicates that the catalysts A–C of this invention have high catalytic activity for use as a steam reforming catalyst and precipitate carbon in a very small amount when used. The catalyst E comprising only ceria as the carrier also exhibits less carbon precipitation when used and, however, it is inferior in catalytic activity to the catalysts of this invention. Further, the catalyst F having a low Ce/Ru atomic ratio is not so high in activity as those of this invention and exhibits comparatively high carbon precipitation when used.

Effects of this Invention

The catalysts of this invention for use in steam reforming of hydrocarbons will enable themselves to be used in a less amount and to keep stable activity for a long time. The catalysts of this invention are suitable particularly for use in a fuel cell system which is operated under a low pressure and a low steam/carbon ratio.

What is claimed is:

1. A catalyst for the steam reforming of hydrocarbons which consists of
   a carrier comprising 10–35 wt. % of a member selected from the group consisting of ceria and rare earth element oxides containing ceria as the main ingredient, and 65–90 wt. % of alumina, and
   0.1–2 wt. % of ruthenium carried on said carrier, the cerium and ruthenium in the catalyst being present in a Ce/Ru atomic ratio ranging from over 10 to 200.

2. A catalyst for the steam reforming of hydrocarbons which consists of
   a carrier comprising 0.5–5 wt. % of at least one kind of a metal in the oxide form selected from the group consisting of alkali metals and alkaline earth metals, 10–35 wt. % of ceria and rare earth element oxides containing ceria as the main ingredient and 65–wt. % of alumina, and
   0.1–2 wt. % of ruthenium carried on said carrier,
   the cerium and ruthenium in the catalyst being present in a Ce/Ru atomic ratio ranging from over 10 to 200.

3. The catalyst according to claim 1 which has surface area of 5–200 $m^2/g$ and a pore volume of 0.05–1 cc/g.

4. The catalyst according to claim 2 which has surface area of 5–200 $m^2/g$ and a pore volume of 0.05–1 cc/g.

* * * * *